United States Patent
Xu et al.

(10) Patent No.: US 12,436,591 B2
(45) Date of Patent: Oct. 7, 2025

(54) NETWORK CHIP MANAGEMENT METHOD AND APPARATUS, COMMUNICATION DEVICE, AND STORAGE MEDIUM

(71) Applicant: Huawei Technologies Co., Ltd., Shenzhen (CN)

(72) Inventors: Xiaodong Xu, Beijing (CN); Xiaodong Wang, Beijing (CN); Yibo Yang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 130 days.

(21) Appl. No.: 18/115,896

(22) Filed: Mar. 1, 2023

(65) Prior Publication Data
US 2023/0280817 A1 Sep. 7, 2023

(30) Foreign Application Priority Data
Mar. 2, 2022 (CN) .......................... 202210199111.4

(51) Int. Cl.
G06F 1/324 (2019.01)
G06F 1/3206 (2019.01)
G06F 9/50 (2006.01)
H04L 41/0833 (2022.01)
H04L 43/08 (2022.01)

(52) U.S. Cl.
CPC .................................. G06F 1/324 (2013.01)

(58) Field of Classification Search
CPC .......... G06F 1/324; G06F 9/50; G06F 1/3206; G06F 1/3203; H04L 41/0833
See application file for complete search history.

(56) References Cited

U.S. PATENT DOCUMENTS

| | | | | |
|---|---|---|---|---|
| 10,296,067 B2 * | 5/2019 | Park | ........................ | G06F 1/329 |
| 2009/0136234 A1 * | 5/2009 | Mottahedin | ............ | H04B 10/40 |
| | | | | 398/135 |
| 2009/0144568 A1 * | 6/2009 | Fung | ....................... | G06F 1/324 |
| | | | | 713/300 |
| 2011/0186631 A1 * | 8/2011 | Hsu | ....................... | G06K 7/0095 |
| | | | | 714/E11.159 |
| 2013/0147526 A1 * | 6/2013 | Kim | ........................ | G06F 1/08 |
| | | | | 327/114 |
| 2014/0181553 A1 * | 6/2014 | Eckert | ..................... | G06F 1/329 |
| | | | | 713/323 |

FOREIGN PATENT DOCUMENTS

CN 113132272 A 7/2021

* cited by examiner

*Primary Examiner* — Jaweed A Abbaszadeh
*Assistant Examiner* — Gayathri Sampath
(74) *Attorney, Agent, or Firm* — Slater Matsil, LLP

(57) ABSTRACT

This disclosure belongs to the field of communication technologies, and provides a network chip management method and apparatus, a communication device, and a storage medium. According to the network chip management method provided in this disclosure, an idle target network chip is determined based on at least one of a port status, a configuration status, and a traffic status of a network chip; and a first functional module in the target network chip is controlled to run at a sleep running frequency, so that power consumption of the target network chip can be effectively reduced.

20 Claims, 5 Drawing Sheets

NETWORK CHIP MANAGEMENT METHOD AND APPARATUS, COMMUNICATION DEVICE, AND STORAGE MEDIUM

CROSS-REFERENCE TO RELATED APPLICATIONS

This application claims priority to Chinese Patent Application No. 202210199111.4, filed on Mar. 2, 2022, which is hereby incorporated by reference in its entirety.

TECHNICAL FIELD

This disclosure relates to the field of communication technologies, and in particular, to a network chip management method and apparatus, a communication device, and a storage medium.

BACKGROUND

A communication device, for example, a router or a switch, includes a service board, where the service board is configured to receive and send a packet.

A network chip receives and sends a packet on the service board. During actual application, a part of network chips of the service board may receive or send no packet for a long period of time. This type of network chips may be considered as network chips in an idle state.

Although the network chips in the idle state receive or send no packet, the network chips still have very high power consumption.

SUMMARY

This disclosure provides a network chip management method and apparatus, a communication device, and a storage medium. In the method, an idle target network chip is determined; and a first functional module in the target network chip is controlled to run at a sleep running frequency, so that power consumption of the target network chip can be effectively reduced. The following describes technical solutions provided in this disclosure.

According to a first aspect, this disclosure provides a network chip management method. The method is applied to a communication device. The communication device has a service board. The service board has a network chip. The method includes: determining a target network chip based on at least one of a port status, a configuration status, and a traffic status of the network chip, where the target network chip is a network chip in an idle state; obtaining a sleep running frequency of a first functional module in the target network chip, where the sleep running frequency is less than a predetermined proportion or a predetermined value of a standard running frequency of the first functional module, where for example, the predetermined proportion may be 5% of the standard running frequency of the first functional module; and controlling the first functional module to run at the sleep running frequency.

According to the technical solutions provided in this disclosure, the idle target network chip is determined; and the first functional module in the target network chip is controlled to run at the extremely low sleep running frequency, so that power consumption of the network chip can be effectively reduced.

In a possible implementation, the first functional module is any functional module in the target network chip.

In a possible implementation, the first functional module is any functional module, in the target network chip, whose function availability does not need to be ensured.

In a possible implementation, the first functional module is a functional module, in the target network chip, whose function availability does not need to be ensured and that does not support clock gating and power gating or to which clock gating is not applicable.

The functional module to which clock gating is not applicable is a functional module that supports clock gating and whose reliability is reduced after clock gating.

In a possible implementation, the first functional module is a functional module manufactured at a 16 nm, 7 nm, or more advanced process node. Usually, reliability of the functional module is affected after clock gating.

In a possible implementation, the determining a target network chip based on at least one of a port status, a configuration status, and a traffic status of the network chip includes: determining a network chip that meets an idle condition as the target network chip, where the idle condition is that none of ports of the network chip are connected to an optical module within latest first duration, each of ports of the network chip is in a disabled state within latest second duration, each of ports of the network chip is in an unconfigured state within latest third duration, or traffic of each of ports of the network chip is 0 within latest fourth duration.

In a possible implementation, the obtaining a sleep running frequency of a first functional module in the target network chip includes: obtaining a preset sleep running frequency of the first functional module.

In a possible implementation, after the determining a target network chip, the method further includes: obtaining a low-power-consumption running frequency of a second functional module in the target network chip, where the low-power-consumption running frequency is less than a standard running frequency of the second functional module, and when the second functional module runs at the low-power-consumption running frequency, a function of the second functional module is available; and controlling the second functional module to run at the low-power-consumption running frequency.

The second functional module is a functional module, in the target network chip, whose function availability needs to be ensured, and may be configured to implement some basic functions. For example, the second functional module is a management and configuration module and a detection module.

According to the technical solutions provided in this disclosure, the low-power-consumption running frequency is determined; and the second functional module is controlled to run at the low-power-consumption running frequency, so that power consumption of the target network chip is further reduced, and function availability of the second functional module of the target network chip is ensured.

In a possible implementation, the obtaining a low-power-consumption running frequency of a second functional module in the target network chip includes: controlling the second functional module to run at at least one candidate running frequency, and performing functional testing; and determining a lowest candidate running frequency in a candidate running frequency at which functional testing is passed as the low-power-consumption running frequency.

According to the technical solutions provided in this disclosure, the low-power-consumption running frequency is determined through functional testing, so that the lowpower-consumption running frequency is low, and power consumption of the second functional module is further reduced.

In a possible implementation, the obtaining a low-power-consumption running frequency of a second functional module in the target network chip includes: obtaining a preset low-power-consumption running frequency of the second functional module.

In a possible implementation, after the determining a target network chip, the method further includes one or more of the following operations:
 disabling a pin of the target network chip, or setting a pin of the target network chip to a high resistive state; controlling to perform clock gating on a third functional module in the target network chip; and controlling to perform power gating on a fourth functional module in the target network chip.

The third functional module is a functional module that supports clock gating and whose reliability is not affected after clock gating. The fourth functional module is a functional module that supports power gating.

According to the technical solutions provided in this disclosure, power consumption of the target network chip is further reduced by using the foregoing operations.

In a possible implementation, after the controlling the first functional module to run at the sleep running frequency, the method further includes: when determining that the target network chip is in a non-idle state, controlling a running frequency of the first functional module to be increased to a first running frequency.

When the first functional module runs at the first running frequency, a function of the first functional module is available. The first running frequency may be the standard running frequency of the first functional module, or may be a running frequency lower than the standard running frequency of the first functional module. This is not limited in this embodiment of this disclosure.

In a possible implementation, when it is determined that the target network chip is in the non-idle state, a running frequency of the second functional module is controlled to be increased to the corresponding standard running frequency.

In a possible implementation, when it is determined that the target network chip is in the non-idle state, a clock of the third functional module is enabled.

In a possible implementation, when it is determined that the target network chip is in the non-idle state, power on the fourth functional module is enabled.

In a possible implementation, when it is determined that the target network chip is in the non-idle state, the pin of the target network chip is controlled to be enabled, or the pin of the target network chip is set to a low resistive state.

According to the technical solutions provided in this disclosure, by using the foregoing operations, when the target network chip is in the non-idle state, the target network chip is woken up, and all the functional modules of the target network chip are available, so that data can be normally received and sent.

In a possible implementation, the determining that the target network chip is in a non-idle state includes: when determining that the target network chip meets a non-idle condition, determining that the target network chip is in the non-idle state.

In a possible implementation, the non-idle condition is that at least one port of the target network chip is switched from a state of not connecting to an optical module to a state of connecting to the optical module.

In a possible implementation, the non-idle condition is that at least one port of the target network chip is switched from an unconfigured state to a configured state.

In a possible implementation, the non-idle condition is that at least one port of the target network chip is switched from a disabled state to an enabled state.

In a possible implementation, after the controlling the first functional module to run at the sleep running frequency, the method further includes: when a failure mode and effects analysis (FMEA) detection periodicity is reached, controlling the running frequency of the first functional module to be increased to a second running frequency; and controlling the target network chip to perform FMEA detection.

When the first functional module runs at the second running frequency, the function of the first functional module is available. The second running frequency may be the standard running frequency of the first functional module, or may be a running frequency lower than the standard running frequency of the first functional module. This is not limited in this embodiment of this disclosure.

In a possible implementation, when the FMEA detection periodicity is reached, the running frequency of the second functional module is controlled to be increased to the corresponding standard running frequency.

In a possible implementation, when the FMEA detection periodicity is reached, a clock of the third functional module is enabled.

In a possible implementation, when the FMEA detection periodicity is reached, power on the fourth functional module is enabled.

In a possible implementation, when the FMEA detection periodicity is reached, the pin of the target network chip is controlled to be enabled, or the pin of the target network chip is set to a low resistive state.

According to the technical solutions provided in this disclosure, by using the foregoing operations, when the FMEA detection periodicity is reached, the target network chip is woken up, and all the functional modules of the target network chip are available, so that FMEA detection can be normally performed. After detection, if it is found that a reliability problem occurs in the target network chip, fast hardware isolation and/or a replacement operation may be performed in a timely manner.

According to a second aspect, this disclosure provides a network chip management apparatus. The apparatus is located in a communication device. The communication device has a service board. The service board has a network chip. The apparatus includes a determining module, an obtaining module, and a control module.

The determining module is configured to determine a target network chip based on at least one of a port status, a configuration status, and a traffic status of the network chip, where the target network chip is a network chip in an idle state.

The obtaining module is configured to obtain a sleep running frequency of a first functional module in the target network chip, where the sleep running frequency is less than a predetermined proportion or a predetermined value of a standard running frequency of the first functional module, where for example, the predetermined proportion may be 5% of the standard running frequency of the first functional module.

The control module is configured to control the first functional module to run at the sleep running frequency.

In a possible implementation, the determining module is configured to:

determine a network chip that meets an idle condition as the target network chip, where the idle condition is that none of ports of the network chip are connected to an optical module within latest first duration, each of ports of the network chip is in a disabled state within latest second duration, each of ports of the network chip is in an unconfigured state within latest third duration, or traffic of each of ports of the network chip is 0 within latest fourth duration.

In a possible implementation, the obtaining module is configured to:

obtain a preset sleep running frequency of the first functional module.

In a possible implementation, the obtaining module is further configured to obtain a low-power-consumption running frequency of a second functional module in the target network chip, where the low-power-consumption running frequency is less than a standard running frequency of the second functional module, and when the second functional module runs at the low-power-consumption running frequency, a function of the second functional module is available.

The control module is further configured to control the second functional module to run at the low-power-consumption running frequency.

In a possible implementation, when obtaining the low-power-consumption running frequency, the obtaining module is configured to:

control the second functional module to run at at least one candidate running frequency, and perform functional testing; and determine a lowest candidate running frequency in a candidate running frequency at which functional testing is passed as the low-power-consumption running frequency.

In a possible implementation, when obtaining the low-power-consumption running frequency, the obtaining module is configured to:

obtain a preset low-power-consumption running frequency of the second functional module.

In a possible implementation, the apparatus further includes one or more of the following modules:

a pin control module, configured to: disable a pin of the target network chip, or set a pin of the target network chip to a high resistive state;

a first control module, configured to control to perform clock gating on a third functional module in the target network chip; and a second control module, configured to control to perform power gating on a fourth functional module in the target network chip.

In a possible implementation, the apparatus further includes a first wake-up module, where the first wake-up module is configured to:

when determining that the target network chip is in a non-idle state, control a running frequency of the first functional module to be increased to a first running frequency, where when the first functional module runs at the first running frequency, a function of the first functional module is available.

In a possible implementation, the first wake-up module is configured to:

when determining that the target network chip meets a non-idle condition, determine that the target network chip is in the non-idle state, where the non-idle condition is that at least one port of the target network chip is switched from a state of not connecting to an optical module to a state of connecting to the optical module, at least one port of the target network chip is switched from an unconfigured state to a configured state, or at least one port of the target network chip is switched from a disabled state to an enabled state.

In a possible implementation, the apparatus further includes a second wake-up module, where the second wake-up module is configured to:

when a failure mode and effects analysis FMEA detection periodicity is reached, control the running frequency of the first functional module to be increased to a second running frequency, where when the first functional module runs at the second running frequency, the function of the first functional module is available; and control the target network chip to perform FMEA detection.

According to a third aspect, this disclosure provides a communication device. The communication device includes a processor and a service board. The service board has a network chip. The processor is configured to execute computer instructions, to enable the communication device to perform the network chip management method according to any implementation of the first aspect.

According to a fourth aspect, a computer-readable storage medium is provided. The computer-readable storage medium stores at least one computer instruction. The computer instruction is read by a processor of a communication device, to enable the communication device to perform the network chip management method according to any implementation of the first aspect.

According to a fifth aspect, this disclosure provides a computer program product. The computer program product includes computer instructions. The computer instructions are stored in a computer-readable storage medium. A processor of a communication device reads the computer instructions from the computer-readable storage medium. The processor executes the computer instructions, to enable the communication device to perform the network chip management method according to any implementation of the first aspect.

According to a sixth aspect, this disclosure provides a chip. The chip includes a memory and a processor. The memory is configured to store computer instructions. The processor is configured to: invoke the computer instructions from the memory, and run the computer instructions, to perform the network chip management method according to any implementation of the first aspect.

DESCRIPTION OF EMBODIMENTS

A communication device, for example, a router or a switch, is configured to receive and send a packet. The communication device may include a frame-shaped communication device and a box-shaped communication device.

Figure 1:
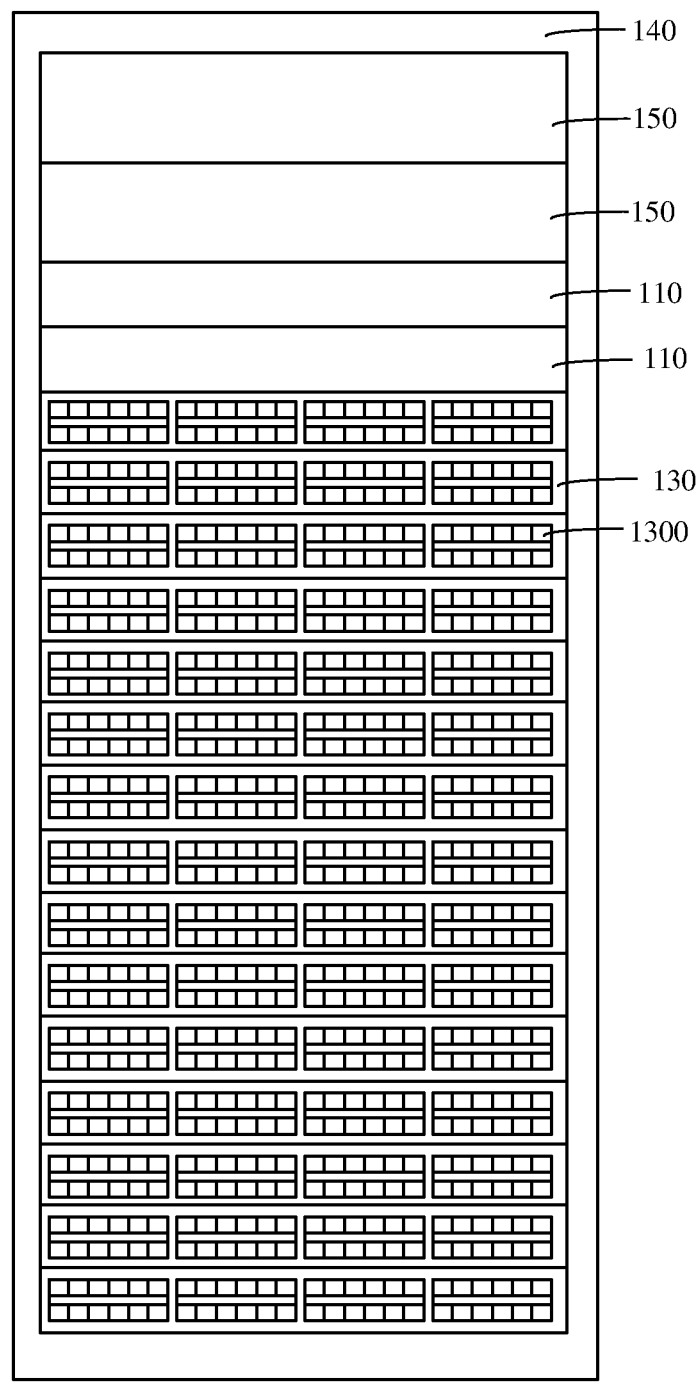
FIG. 1 is a schematic diagram of a frame-shaped communication device according to an embodiment of this disclosure.

As shown in FIG. 1, the frame-shaped communication device includes a main control board 110, a switch board 120 (not shown in FIG. 1), a service board 130, a subrack 140, and a power module 150. The main control board 110 is configured to manage the switch board 120 and the service board 130. The switch board 120 is responsible for forwarding a packet between different service boards 130. The service board 130 has a network chip, and the network chip is responsible for receiving and sending a packet. Specifically, the network chip has a plurality of ports 1300, and the port 1300 is configured to interconnect with an optical module, to receive and send the packet.

Figure 2:
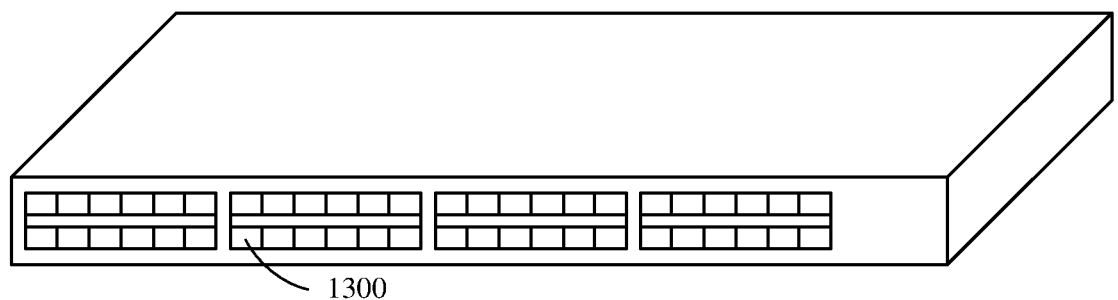
FIG. 2 is a schematic diagram of a box-shaped communication device according to an embodiment of this disclosure.

As shown in FIG. 2, the box-shaped communication device includes a service board 130. The service board 130 has a network chip, and the network chip is responsible for receiving and sending a packet. Specifically, the network chip has a plurality of ports 1300, and the port 1300 is configured to interconnect with an optical module, to receive and send the packet.

Figure 3:
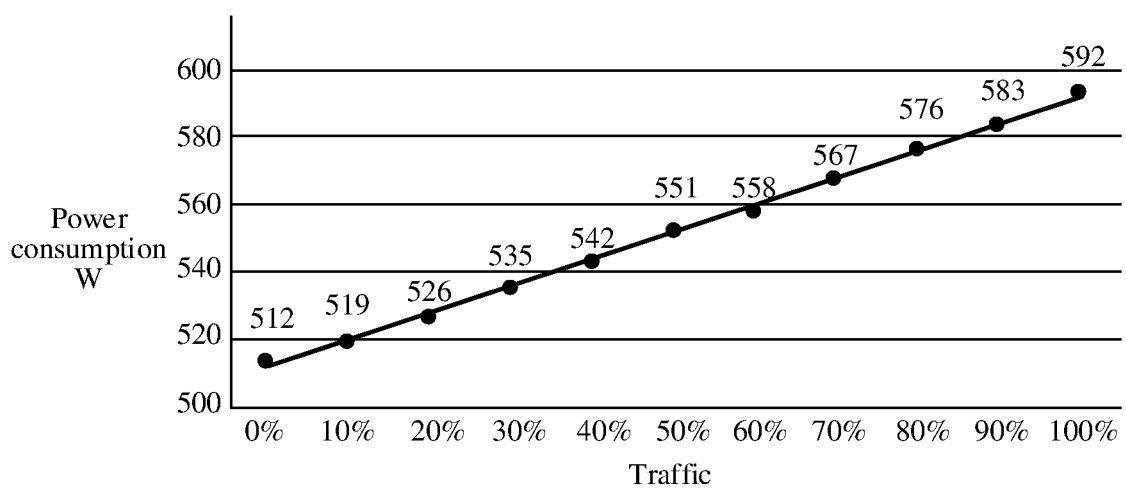
FIG. 3 is a diagram of a comparison between power consumption of a service board working under different traffic according to an embodiment of this disclosure.

During network running, a large quantity of ports 1300 of the communication device have an idle proportion. When all ports 1300 corresponding to a network chip are idle, it may be considered that the network chip is in an idle state. However, the network chip in the idle state still has high power consumption. As shown in FIG. 3, all network chips of a service board are in an idle state, and traffic corresponding to the service board is 0%. In this case, a ratio of power consumption of the service board to power consumption when the traffic is 100% is as high as 512/592=86.5%.

To reduce power consumption of the network chip, the following several solutions are usually used in related technologies.

(1) Power Off all Idle Network Chips.

However, an idle network chip can be independently powered off only when each network chip supports independent power supply. However, during actual application, many network chips do not support independent power supply.

(2) Perform Clock Gating Processing on a Part of Functional Modules in an Idle Network Chip.

However, clock gating processing cannot be performed on a part of functional modules in the network chip. In addition, although clock gating processing can be performed on a part of functional modules, reliability of the functional modules is reduced after clock gating processing. For example, for functional modules manufactured at some process nodes (especially advanced processes node such as a 16 nm FinFET process node and a higher process node), after clock gating, reliability of the functional modules is affected, and a deterministic Bias Temperature Instability (BTI) failure mainly occurs under a direct current (DC) voltage.

(3) Perform Hard Reset Processing on an Idle Network Chip, to Enable the Network Chip to Remain in a Reset State.

However, resetting is not a long-term working state designed for the network chip. In addition, after hard resetting is performed on the network chip, clock gating is actually performed on a functional module in the network chip. Therefore, hard resetting performed on the network chip also affects reliability of a part of functional modules.

In view of the foregoing technical problems, embodiments of this disclosure provide a network chip management method. In the method, a target network chip in an idle state is determined based on at least one of a port status, a configuration status, and a traffic status of the network chip. Then, a first functional module in the target network chip is controlled to run at a sleep running frequency.

Because the sleep running frequency is an extremely low running frequency, for example, lower than 5% of a standard running frequency, power consumption of the first functional module is greatly reduced after the first functional module runs at the sleep running frequency. In addition, because hard reset processing and clock gating processing are not performed on the first functional module, reliability of the first functional module is not affected.

The network chip management method provided in embodiments of this disclosure may be performed by a communication device. For example, the method may be performed by a processor in the communication device, and the processor is configured to manage a network chip. In some examples, the processor is located in a main control board of the communication device. In some other examples, the processor is located in a service board of the communication device.

The following describes the communication device by using an example.

Figure 4:
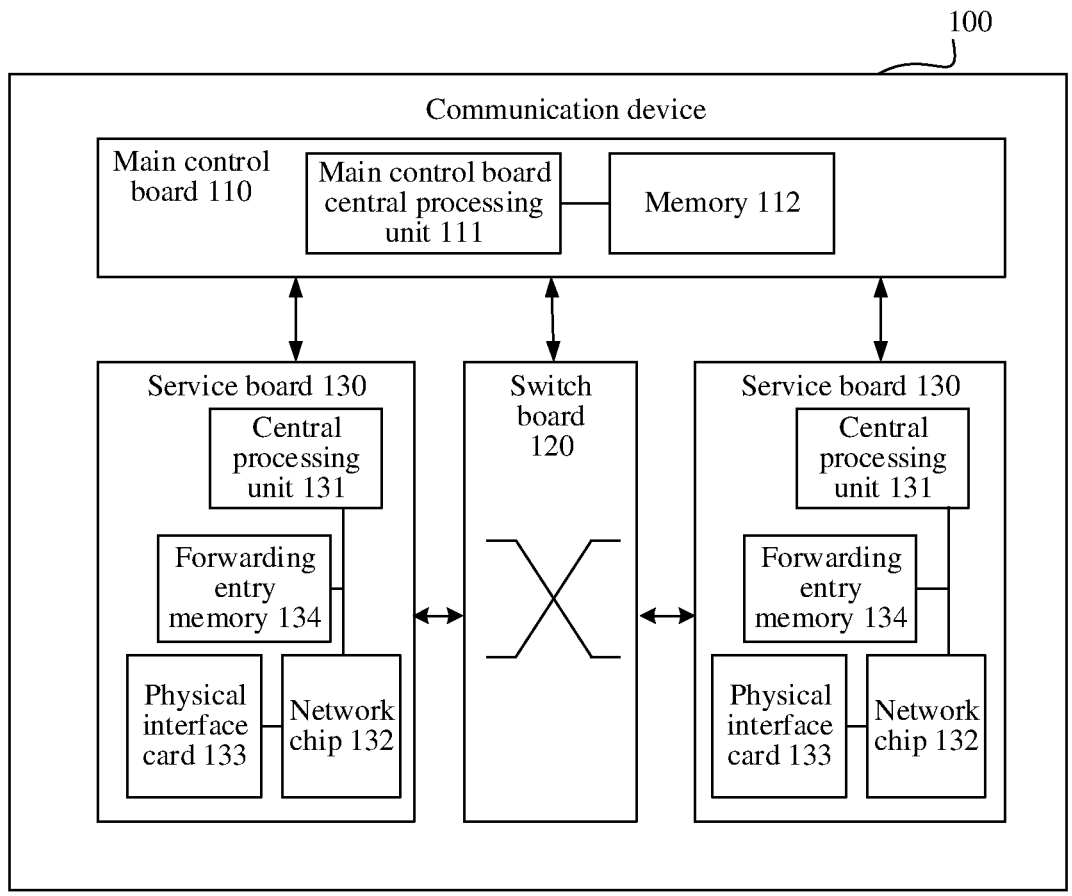
FIG. 4 is a schematic diagram of a structure of a communication device according to an embodiment of this disclosure.

FIG. 4 is a schematic diagram of a structure of a communication device 100. The communication device 100 includes a main control board 110 and a service board 130.

The main control board 110 is also referred to as a main processing unit (MPU) or a route processor card. The main control board 110 is configured to control and manage components in the communication device 100, including functions such as routing calculation, device management, device maintenance, and protocol processing. The main control board 110 includes a main control board central processing unit 111 and a memory 112. The network chip management method provided in embodiments of this disclosure may be performed by the main control board central processing unit 111 on the main control board 110.

The service board 130 is also referred to as an interface board, a line processing unit (LPU), or a line card. The service board 130 is configured to: provide various service interfaces, and forward a data packet. The service interfaces include but are not limited to an Ethernet interface, a POS (Packet over SONET/SDH) interface, and the like. The Ethernet interface is, for example, a flexible Ethernet service interface (Flexible Ethernet Clients, FlexE Clients). The service board 130 includes a central processing unit 131, a network chip 132, a forwarding entry memory 134, and a physical interface card (PIC) 133.

The central processing unit 131 on the service board 130 is configured to: control and manage the service board 130, and communicate with the main control board central processing unit 111 on the main control board 110. The network chip management method provided in embodiments of this disclosure may alternatively be performed by the central processing unit 131 on the service board 130.

The network chip 132 is configured to implement packet forwarding processing. A form of the network chip 132 may be a forwarding chip. Specifically, the network chip 132 is configured to forward a received packet based on a forwarding table stored in the forwarding entry memory 134. If a destination address of the packet is an address of the communication device 100, the network chip 132 sends the packet to a CPU (for example, the main control board central processing unit 111) for processing. If a destination address of the packet is not an address of the communication device 100, the network chip 132 searches for, based on the destination address, a next hop and an outbound interface corresponding to the destination address in the forwarding table, and forwards the packet to the outbound interface corresponding to the destination address. Processing on an uplink packet includes processing on a packet inbound interface and forwarding table lookup. Processing on a downlink packet includes forwarding table lookup and the like.

The physical interface card 133 is configured to implement a physical layer interconnection function. Original traffic enters the service board 130 from the physical interface card 133, and a processed packet is sent out from the physical interface card 133. The physical interface card 133, also referred to as a subcard, may be installed on the service board 130, and is responsible for converting an optical/electrical signal into a packet, performing validity check on the packet, and forwarding the packet to the network chip 132 for processing. In some embodiments, the central processing unit may alternatively perform a function of the network chip 132, for example, implement software forwarding based on a general-purpose CPU. Therefore, the network chip 132 is not necessary in the physical interface card 133. The physical interface card 133 may have a port 1300.

In some examples, the communication device 100 includes a plurality of service boards 130.

In some examples, the communication device 100 further includes a switch board 120. The switch board 120 may also be referred to as a switch fabric unit (SFU). When the communication device 100 has a plurality of service boards 130, the switch board 120 is configured to complete data exchange between the service boards 130. For example, two service boards 130 in FIG. 4 may communicate with each other by using the switch board 120.

The main control board 110 is coupled to the service board 130. For example, the main control board 110, the two service boards 130, and the switch board 120 are connected to a system backboard by using a system bus for interworking. In some examples, an inter-process communication (IPC) channel is established between the main control board 110 and the service board 130, and the main control board 110 and the service board 130 communicate with each other through the IPC channel.

Logically, the communication device 100 includes a control plane and a forwarding plane. The control plane includes the main control board 110 and the central processing unit 131. The forwarding plane includes components used for forwarding, for example, the forwarding entry memory 134, the physical interface card 133, and the network chip 132. The control plane performs functions such as a function of a router, generating a forwarding table, processing signaling and protocol packets, configuring and maintaining a status of a device, and managing the network chip 132. The control plane delivers the generated forwarding table to the forwarding plane. On the forwarding plane, the network chip 132 searches the forwarding table delivered by the control plane to forward a packet received by the physical interface card 133. The forwarding table delivered by the control plane may be stored in the forwarding entry memory 134. In some embodiments, the control plane and the forwarding plane may be completely separated, and are not on a same device.

It should be noted that, there may be one or more main control boards 110, and when there are a plurality of main control boards 110, the main control boards 110 may include an active main control board and a standby main control board. There may be one or more service boards 130. A stronger data processing capability of the communication device indicates a larger quantity of provided service boards 130. There may also be one or more physical interface cards on the service board 130. There may be no switch board 120 or one or more switch boards 120. When there are a plurality of switch boards 120, load balancing and redundancy backup may be implemented together. In a centralized forwarding architecture, the communication device may not need a switch board 120, and the service board 130 undertakes a service data processing function of an entire system. In a distributed forwarding architecture, the communication device may have at least one switch board 120, and data is exchanged between a plurality of service boards 130 by using the switch board 120, to provide a capability of exchanging and processing a large capacity of data. Therefore, a data access and processing capability of the communication device in the distributed architecture is greater than the device in the centralized architecture. In some examples, the communication device may alternatively be in a form in which there is only one card. To be specific, there is no switch board 120, and functions of the service board 130 and the main control board 110 are integrated on the card. In this case, the central processing unit 131 on the service board 130 and the main control board central processing unit 111 on the main control board 110 may be combined into one central processing unit on the card, to perform functions obtained after the two central processing units are combined. The device in this form (for example, a communication device such as a low-end switch or a router) has a low data exchange and processing capability. A specific architecture that is to be used depends on a specific networking deployment scenario. This is not limited herein.

Figure 5:
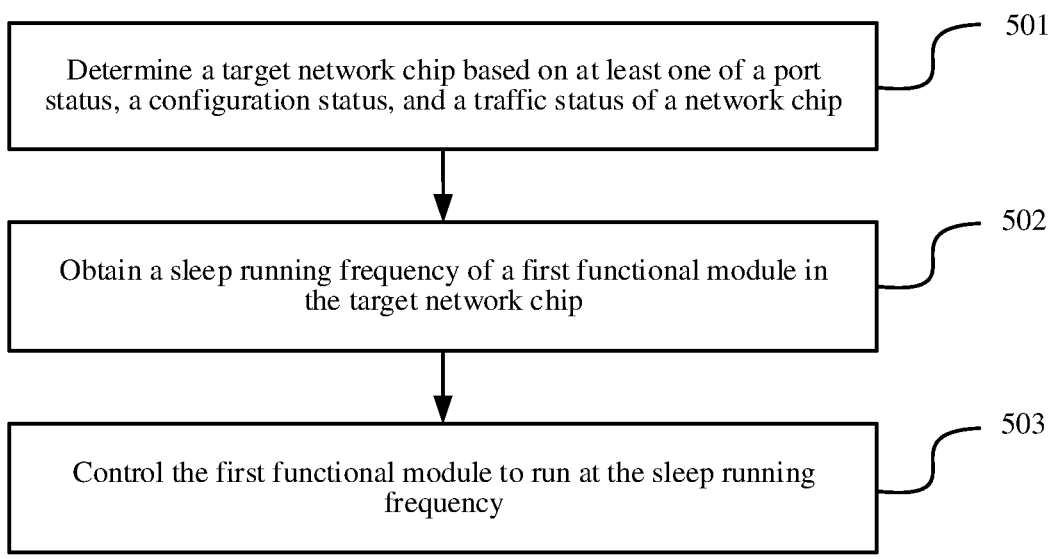
FIG. 5 is a flowchart of a network chip management method according to an embodiment of this disclosure.

Refer to FIG. 5. With reference to a specific implementation, the following describes in detail a processing procedure of a network chip management method according to an embodiment of this disclosure. Content may be as follows:

Step 501: Determine a target network chip based on at least one of a port status, a configuration status, and a traffic status of a network chip.

The target network chip is a network chip in an idle state.

According to technical solutions provided in this embodiment of this disclosure, when the target network chip is determined, a network chip that meets an idle condition is determined as the target network chip. The idle condition may include one or more of a port status condition, a configuration status condition, and a traffic status condition.

The following describes the idle condition by using an example.

In some examples, the idle condition is the port status condition. In this case, the idle condition may be that none of ports of the network chip are connected to an optical module.

When none of the ports of the network chip are connected to the optical module, the network chip cannot receive or send a packet. Therefore, the network chip may be considered as the target network chip in the idle state. To more accurately determine the target network chip, in some examples, the idle condition may be that none of the ports of the network chip are connected to the optical module within latest first duration.

In some other examples, the idle condition is the port status condition. In this case, the idle condition may be that each of ports of the network chip is in a disabled state.

When each of the ports of the network chip is configured to be in the disabled state by a user, the network chip cannot receive or send a packet. Therefore, the network chip may be considered as the target network chip in the idle state. To more accurately determine the target network chip, in some examples, the idle condition may be that each of the ports of the network chip is in the disabled state within latest second duration.

In some examples, the idle condition is the configuration status condition. In this case, the idle condition is that each of ports of the network chip is in an unconfigured state.

Configuration in the unconfigured state may include one or more of configuration of a media access control (MAC) address, configuration of an internet protocol address (IP), configuration of a forwarding information base (FIB) entry, configuration of a traffic management (TM) buffer, configuration of a switch fabric interface virtual output queue (VOQ) buffer, and the like.

In some examples, the idle condition is that a MAC address and an IP address of each of the ports of the network chip are in the unconfigured state. In other words, when it is determined that the MAC address and the IP address of each of the ports of the network chip are not configured, the network chip is determined as the target network chip.

In some examples, the idle condition is that a MAC address, an IP address, and an FIB entry of each of the ports of the network chip are in the unconfigured state. In other words, when it is determined that the MAC address, the IP address, and the FIB entry of each of the ports of the network chip are not configured, the network chip is determined as the target network chip.

In some examples, the idle condition is that a MAC address, an IP address, an FIB entry, a TM buffer, a VOQ buffer of each of the ports of the network chip are in the unconfigured state. In other words, when it is determined that the MAC address, the IP address, the FIB entry, the TM buffer, the VOQ buffer of each of the ports of the network chip are in the unconfigured state, the network chip is determined as the target network chip.

When each of the ports of the network chip is in the unconfigured state, the network chip cannot normally receive or send a packet. Therefore, the network chip may be considered as the target network chip in the idle state. To more accurately determine the target network chip, in some examples, the idle condition may be that each of the ports of the network chip is in the unconfigured state within latest third duration.

It should be noted that, when each of the ports of the network chip is in the unconfigured state, the target network chip may also receive a spurious random packet. However, regardless of whether the packet can be received, the network chip is considered as the target network chip in the idle state.

In some examples, the idle condition is the traffic status condition. In this case, the idle condition may be that traffic of each of ports of the network chip is 0 within latest fourth duration.

That the traffic is 0 within the latest fourth duration may also be understood as that there is no packet within the latest fourth duration.

When the traffic of each of the ports of the network chip is 0 within the fourth duration, it indicates that the network chip is probably in the idle state. Longer fourth duration indicates a higher probability that the network chip is in the idle state.

It should be noted that values of the first duration, the second duration, the third duration, and the fourth duration may be set based on a requirement of the user. This is not specifically limited in this embodiment of this disclosure. When the user has a high requirement on network reliability, the first duration, the second duration, the third duration, and the fourth duration may be set to be longer. When the user has a low requirement on network reliability, the first duration, the second duration, the third duration, and the fourth duration may be set to be shorter.

Figure 6:
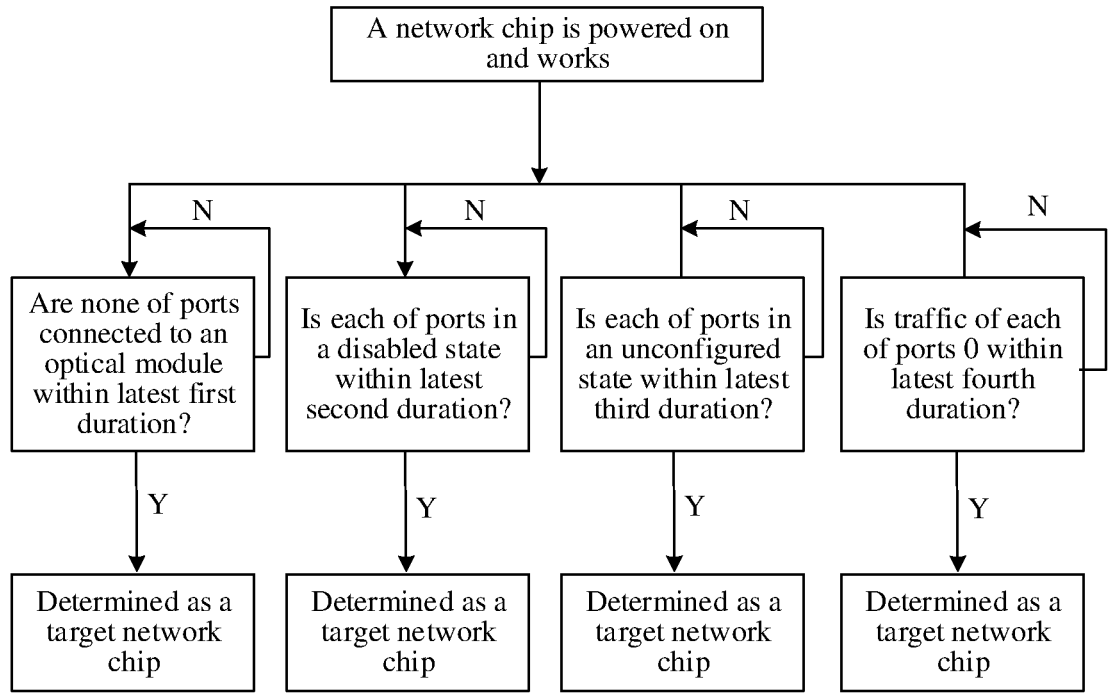
FIG. 6 is a schematic diagram of a process of determining a target network chip according to an embodiment of this disclosure.

All the foregoing idle conditions may be used. For example, as shown in FIG. 6, when the network chip meets any one of the foregoing idle conditions, the network chip is determined as the target network chip. Alternatively, a part of the foregoing idle conditions may be used. For example, when a high requirement is imposed on network reliability, the network chip may be determined as the target network chip only when each of the ports of the network chip is in the disabled state, or none of the ports of the network chip are connected to the optical module. When each of the ports of the network chip is in the unconfigured state, and when the traffic of each of the ports of the network chip is 0 within the latest fourth duration, it is no longer considered that the network chip is in the idle state.

In addition, the foregoing idle conditions may be uniformly configured by users, so that requirements of different users can be better met. The users may configure corresponding idle conditions based on requirements on network reliability. For example, based on the requirements on network reliability, the corresponding idle conditions are selected, and specific values of the first duration, the second duration, the third duration, and the fourth duration in the idle conditions are set.

Step 502: Obtain a sleep running frequency of a first functional module in the target network chip.

The sleep running frequency is less than a predetermined proportion or a predetermined value of a standard running frequency of the first functional module. In some examples, the sleep running frequency is less than 5% of the standard running frequency of the first functional module, for example, less than 1% of the standard running frequency of the first functional module. The sleep running frequency is an extremely low running frequency, which is as low as a MHz level or a kHz level. For example, the sleep running frequency may be less than 10 MHz. For another example, the sleep running frequency is less than 1 MHz. The standard running frequency is a running frequency of a functional module in the network chip when the functional module works normally. The standard running frequency may also be referred to as a maximum running frequency.

When the first functional module runs at the sleep running frequency, function availability of the first functional module is not ensured. For example, when the first functional module runs at the sleep running frequency, a function of the first functional module is unavailable.

In some examples, the first functional module is any functional module in the target network chip.

In some other examples, the first functional module is any functional module, in the target network chip, whose function availability does not need to be ensured, for example, a functional module other than a detection functional module and a management and configuration functional module.

In some other examples, the first functional module is a functional module, in the target network chip, whose function availability does not need to be ensured and that does not support clock gating and power gating or to which clock gating is not applicable.

The functional module to which clock gating is not applicable is a functional module that supports clock gating and whose reliability is reduced after clock gating.

The sleep running frequency of the functional module that does not support clock gating and power gating or to which clock gating is not applicable is determined, and the functional module is controlled to run at the sleep running frequency, so that power consumption of the functional module is reduced, and reliability of the functional module is not affected.

In some examples, the first functional module is a functional module manufactured at a 16 nm, 7 nm, or more advanced process node. Usually, reliability of the functional module is affected after clock gating.

A manner of obtaining the sleep running frequency of the first functional module is not limited in this embodiment of this disclosure. In some examples, a preset sleep running frequency of the first functional module is obtained. Because function availability of the first functional module does not need to be ensured at the sleep running frequency, the user may set the sleep running frequency through the communication device.

In some examples, for the target network chip in the idle state, all functional modules may be in a sleep state, for example, all the functional modules are controlled to run at the sleep running frequency.

In some other examples, for the target network chip in the idle state, not all functional modules may be in a sleep state. Instead, some basic functional modules (such as the management and configuration functional module and the detection functional module) may be reserved. For example, in a common network application scenario, even if the target network chip is in the idle state, it is preferable to support reading of a chip identification document (identity document, ID), a chip junction temperature, and the like, to help view and manage the target network chip. Therefore, a function of the detection functional module of the target network chip may be set to be available.

Functional modules whose function availability needs to be ensured in the idle state may be collectively referred to as a second functional module. To ensure function availability of the second functional module, in some examples, the second functional module is controlled to run at a standard running frequency.

In some other examples, to further reduce power consumption of the target network chip, a low-power-consumption running frequency of the second functional module in the target network chip may be obtained, and the second functional module is controlled to run at the low-power-consumption running frequency.

The low-power-consumption running frequency is less than the standard running frequency of the second functional module, and is different from the sleep running frequency. When the second functional module runs at the low-power-consumption running frequency, a function of the second functional module is available. Usually, the low-power-consumption running frequency is less than the standard running frequency but greater than 10% of the standard running frequency. For example, the low-power-consumption running frequency is greater than ⅛ of the standard running frequency. For example, the low-power-consumption running frequency is greater than 50 MHz. For another example, the low-power-consumption running frequency is greater than 100 MHz.

A manner of obtaining the low-power-consumption running frequency is not limited in this embodiment of this disclosure. In some examples, to reduce power consumption of the target network chip as much as possible, a low low-power-consumption running frequency at which function availability of the second functional module can be ensured may be determined through functional testing.

In some examples, the second functional module is controlled to run at at least one candidate running frequency, and functional testing is performed. A lowest candidate running frequency in a candidate running frequency at which functional testing is passed is determined as the low-power-consumption running frequency.

Figure 7:
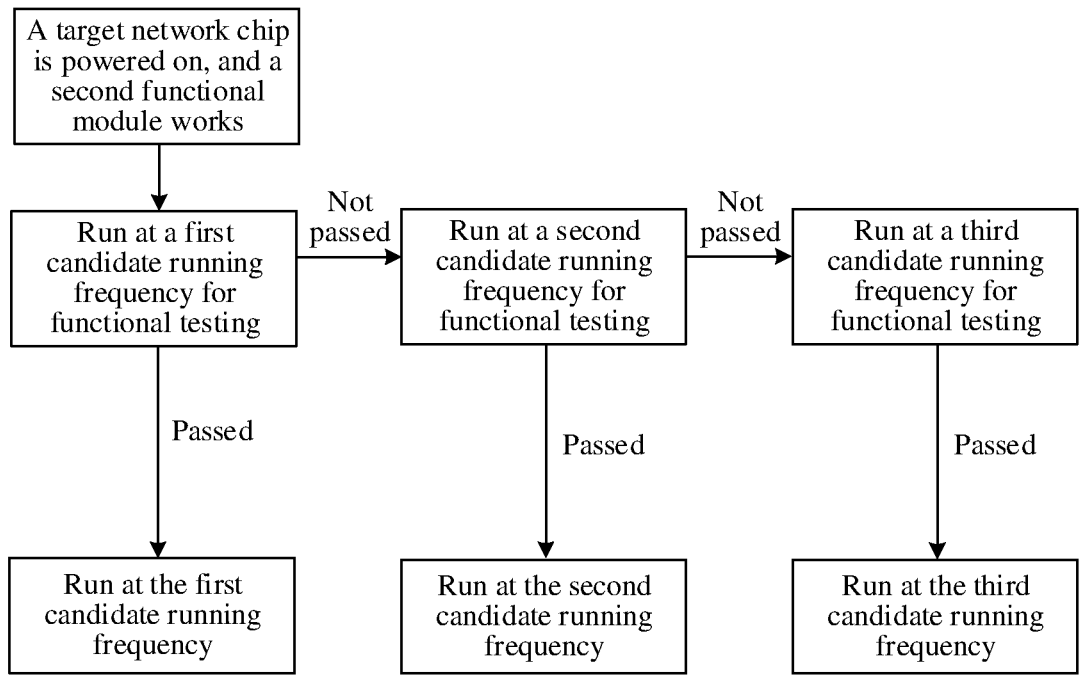
FIG. 7 is a flowchart of performing functional testing on a second functional module according to an embodiment of this disclosure.

For example, as shown in FIG. 7, after the target network chip is powered on and the second functional module works, the second functional module is controlled to run at a first candidate running frequency, and functional testing is performed. If testing is passed, the second functional module is controlled to run at the first candidate running frequency, that is, the first candidate running frequency is determined as the low-power-consumption running frequency. The first candidate running frequency is lower than a subsequent second candidate running frequency and a subsequent third candidate running frequency.

If testing is not passed at the first candidate running frequency, the second functional module is controlled to run at the higher second candidate running frequency, and functional testing is performed. If testing is passed, the second functional module is controlled to run at the second candidate running frequency, that is, the second candidate running frequency is determined as the low-power-consumption running frequency.

If testing is not passed at the second candidate running frequency, the second functional module is controlled to run at the higher third candidate running frequency, and functional testing is performed. If testing is passed, the second functional module is controlled to run at the third candidate running frequency, that is, the third candidate running frequency is determined as the low-power-consumption running frequency.

If testing is not passed at the third candidate running frequency, the second functional module continues to be controlled to run at a higher running frequency, and functional testing is performed until the low-power-consumption running frequency is determined.

In some examples, to ensure reliability of function availability when the second functional module runs at the low-power-consumption running frequency, when functional testing is performed on the second functional module, it may be set that testing is passed only when testing succeeds for a plurality of times at a candidate running frequency.

In addition, the functional testing method shown in FIG. 7 is merely an example, and does not constitute a limitation on this disclosure. In some other examples, testing may be performed at the candidate running frequencies in descending order of frequencies. For example, after testing at a higher running frequency is passed, testing continues to be performed at a lower running frequency until testing at a candidate running frequency is not passed. In this case, a previous candidate running frequency of the candidate running frequency is determined as the low-power-consumption running frequency.

In some other examples, functional testing may not be performed. Instead, a preset low-power-consumption running frequency of the second functional module is obtained.

The preset low-power-consumption running frequency of the second functional module may be a running frequency designed in advance in a chip design phase, and is specially used by the second functional module in a low-power-consumption state.

Step 503: Control the first functional module to run at the sleep running frequency.

According to the technical solutions provided in this embodiment of this disclosure, because the sleep running frequency is an extremely low running frequency, after the first functional module runs at the sleep running frequency, power consumption of the first functional module is very low, so that power consumption of the target network chip is reduced.

To further reduce power consumption of the target network chip, the following processing may be further performed.

In some examples, the second functional module is controlled to run at the low-power-consumption running frequency.

Because the low-power-consumption running frequency is less than the standard running frequency of the second functional module, power consumption of the second functional module is reduced after the second functional module runs at the low-power-consumption running frequency, so that power consumption of the target network chip is reduced.

It should be noted that a running frequency of a functional module may be adjusted by modifying a register of a phase locked loop (PLL) combination circuit corresponding to the functional module, or by adjusting an external reference clock frequency of the target network chip. The running frequency may also be referred to as a clock frequency, a frequency, or the like.

In some examples, clock gating is controlled to be performed on a third functional module in the target network chip. The third functional module may be understood as a functional module that supports clock gating and whose reliability is not affected after clock gating. For example, the third functional module is a functional module manufactured at a 28 nm process node. Clock gating may also be referred to as clock gating.

In some examples, power gating is controlled to be performed on a fourth functional module in the target network chip. The fourth functional module may be understood as a functional module that supports power gating.

In some examples, a pin of the target network chip is disabled, or a pin of the target network chip is set to a high resistive state. The pin is an I/O pin.

In some examples, a high-speed serializing/deserializing circuitry (Serdes) pin is disabled, and a tri-state pin is set to a high resistive state.

The foregoing processing may be referred to as sleep processing, and the target network chip obtained after the foregoing processing may be considered as a target network chip in a sleep state.

During actual application, due to a change of a network, the current network may have a resource requirement for the idle target network chip. In this case, the target network chip in the sleep state needs to be woken up.

In some examples, after the first functional module is controlled to run at the sleep running frequency, when it is determined that the target network chip is in a non-idle state, a running frequency of the first functional module is controlled to be increased to a first running frequency.

When the first functional module runs at the first running frequency, the function of the first functional module is available. The first running frequency may be the standard running frequency of the first functional module, or may be a running frequency lower than the standard running frequency of the first functional module. This is not limited in this embodiment of this disclosure.

Correspondingly, for the second functional module that previously runs at the low-power-consumption running frequency, a running frequency of the second functional module may be controlled to be increased to the corresponding standard running frequency. Certainly, because the function of the second functional module is still available at the low-power-consumption running frequency, the running frequency of the second functional module may not be increased. Instead, the second functional module is controlled to run at the low-power-consumption running frequency, and then the running frequency of the second functional module is increased to the standard running frequency when it is subsequently detected that the second functional module runs at the low-power-consumption running frequency and cannot meet a network requirement.

A clock of the third functional module on which clock gating is previously performed is enabled. Power on the fourth functional module on which power gating is previously performed is enabled. The pin that is previously disabled is enabled. The pin that is previously set to the high resistive state is set to a low resistive state.

After the foregoing processing, the target network chip is woken up, and all the functional modules of the target network chip are available, so that the packet can be normally received and sent. It should be noted that, in a manner of resetting the target network chip, frequencies of the first functional module and the second functional module may be increased, the clock of the third functional module may be enabled, the power on the fourth functional module may be enabled, and the pin may be enabled or set to the low resistive state.

The following describes, by using an example, a manner of determining that the target network chip is in the non-idle state.

In some examples, when it is determined that the target network chip meets a non-idle condition, it is determined that the target network chip is in the non-idle state.

The non-idle condition may be understood as a condition that does not meet the idle condition. The following describes the non-idle condition by using an example.

In some examples, the non-idle condition is that at least one port of the target network chip is switched from a state of not connecting to an optical module to a state of connecting to the optical module.

When the port of the target network chip is connected to the optical module, there is a high probability that the user expects to use the target network chip. In this case, the target network chip needs to be woken up in a timely manner, to meet a subsequent network requirement.

In some examples, the non-idle condition is that at least one port of the target network chip is switched from an unconfigured state to a configured state.

When the port of the target network chip is configured, there is a high probability that the target network chip needs to be used subsequently. In this case, the target network chip needs to be woken up in a timely manner, to meet a subsequent network requirement.

In some examples, the non-idle condition is that at least one port of the target network chip is switched from a disabled state to an enabled state.

When the port of the target network chip is enabled, there is a high probability that the user expects to use the target network chip. In this case, the target network chip needs to be woken up in a timely manner, to meet a subsequent network requirement.

Certainly, if it is found in a period of time after the target network chip is woken up that the target network chip meets the idle condition again, sleep processing needs to be performed on the target network chip again.

In addition, to enable the target network chip to normally perform failure mode and effects analysis (FMEA) detection, in some examples, after the first functional module is controlled to run at the sleep running frequency, when an FMEA detection periodicity is reached, the running frequency of the first functional module is controlled to be increased to a second running frequency.

When the first functional module runs at the second running frequency, the function of the first functional module is available. The second running frequency may be the standard running frequency of the first functional module, or may be a running frequency lower than the standard running frequency of the first functional module. This is not limited in this embodiment of this disclosure.

Correspondingly, for the second functional module that previously runs at the low-power-consumption running frequency, a running frequency of the second functional module may be controlled to be increased to the corresponding standard running frequency. Certainly, because the function of the second functional module is still available at the low-power-consumption running frequency, the running frequency of the second functional module may not be increased. Instead, the second functional module is controlled to run at the low-power-consumption running frequency.

A clock of the third functional module on which clock gating is previously performed is enabled. Power on the fourth functional module on which power gating is previously performed is enabled. The pin that is previously disabled is enabled. The pin that is previously set to the high resistive state is set to a low resistive state.

After the foregoing processing, the target network chip is woken up, and all the functional modules of the target network chip are available. It should be noted that, in a manner of resetting the target network chip, frequencies of the first functional module and the second functional module may be increased, the clock of the third functional module may be enabled, the power on the fourth functional module may be enabled, and the pin may be enabled or set to the low resistive state.

Then, the target network chip is controlled to perform FMEA detection. After detection, if it is found that a reliability problem occurs in the target network chip, fast hardware isolation and/or a replacement operation may be performed in a timely manner.

This embodiment of this disclosure provides the network chip management method. In the method, the idle target network chip is determined; the first functional module in the target network chip is controlled to run at the extremely low sleep running frequency; the second functional module is controlled to run at the low low-power-consumption running frequency; clock gating is controlled to be performed on the third functional module; power gating is controlled to be performed on the fourth functional module; and the pin of the target network chip is disabled, or the pin of the target network chip is set to the high resistive state, so that power consumption of the target network chip can be effectively reduced.

It is learned through an experiment that, according to the network chip management method provided in this embodiment of this disclosure, power consumption of the target network chip can be reduced to no more than 10 W. For example, before the network chip management method provided in this embodiment of this disclosure is used, power consumption of a large quantity of network chips is 83 W. After the network chip management method provided in this embodiment of this disclosure is used, power consumption is reduced to 6.0701 W.

In addition, according to the network chip management method provided in this embodiment of this disclosure, a corresponding wake-up mechanism is set, so that the target network chip can be woken up when the target network chip is in the non-idle state and when the FMEA detection periodicity is reached. Therefore, according to the network chip management method provided in this embodiment of this disclosure, power consumption of the network chip is reduced, and reliability of the network chip is ensured.

Figure 8:
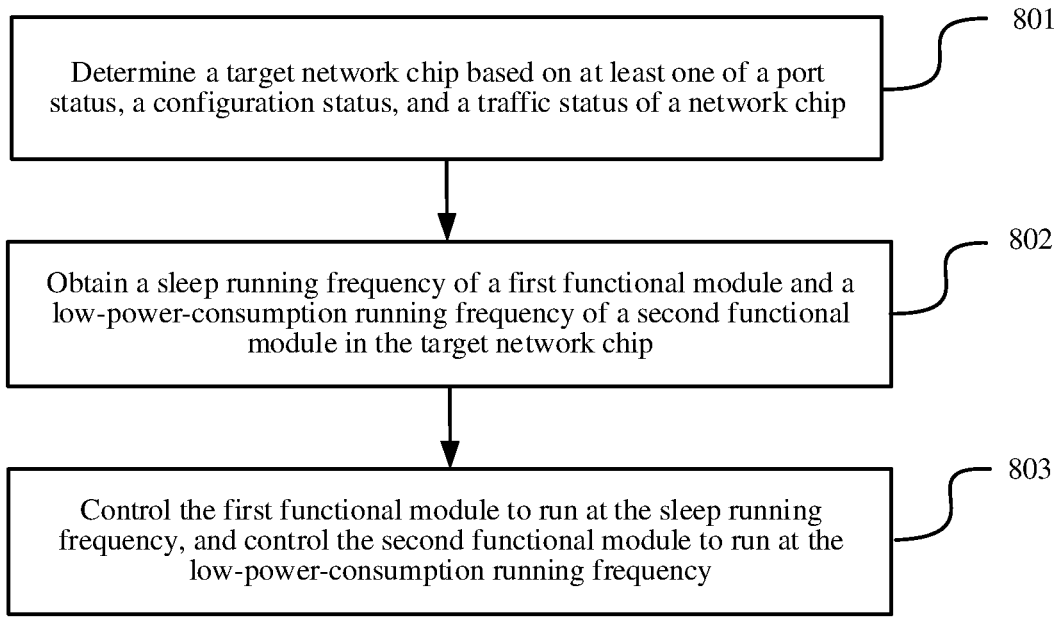
FIG. 8 is a flowchart of a network chip management method according to an embodiment of this disclosure.

An embodiment of this disclosure further provides another network chip management method. As shown in FIG. 8, the method includes the following steps.

Step 801: Determine a target network chip based on at least one of a port status, a configuration status, and a traffic status of a network chip.

The target network chip is a network chip in an idle state.

For specific content of step 801, refer to specific content of step 501. Details are not described herein again.

Step 802: Obtain a sleep running frequency of a first functional module and a low-power-consumption running frequency of a second functional module in the target network chip.

The sleep running frequency is less than a predetermined proportion or a predetermined value of a standard running frequency of the first functional module. In some examples, the sleep running frequency is less than 5% of the standard running frequency of the first functional module. The low-power-consumption running frequency is less than a standard running frequency of the second functional module. When the second functional module runs at the low-power-consumption running frequency, a function of the second functional module is available.

The second functional module is a functional module, in the target network chip, whose function availability needs to be ensured, for example, a management and configuration module and a detection functional module in the target network chip.

The first functional module is a functional module, in the target network chip, whose function availability does not need to be ensured, for example, a functional module other than the second functional module. In some examples, the first functional module is a functional module, in the target network chip, whose function availability does not need to be ensured and that does not support clock gating and power gating or to which clock gating is not applicable.

For specific content of step 802, refer to specific content of step 502. Details are not described herein again.

Step 803: Control the first functional module to run at the sleep running frequency, and control the second functional module to run at the low-power-consumption running frequency.

For specific content of step 803, refer to specific content of step 503. Details are not described herein again.

According to the network chip management method provided in this embodiment of this disclosure, the target network chip is determined based on at least one of the port status, the configuration status, and the traffic status of the network chip; the first functional module in the target network chip is controlled to run at the sleep running frequency; and the second functional module in the target network chip is controlled to run at the low-power-consumption running frequency, so that power consumption of the target network chip is reduced, and it is ensured that a basic function of the target network chip is available in a sleep state.

The foregoing describes the network chip management method provided in embodiments of this disclosure. The following describes a network chip management apparatus provided in embodiments of this disclosure. The network chip management apparatus described below may implement any function in either of the foregoing network chip management methods.

Figure 9:
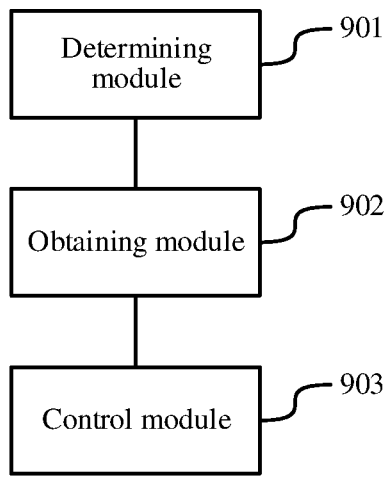
FIG. 9 is a logical block diagram of a network chip management apparatus according to an embodiment of this disclosure.

FIG. 9 is a schematic diagram of a structure of a network chip management apparatus according to an embodiment of this disclosure. The network chip management apparatus is located in a communication device. As shown in FIG. 9, the network chip management apparatus includes a determining module 901, an obtaining module 902, and a control module 903.

The determining module 901 is configured to determine a target network chip based on at least one of a port status, a configuration status, and a traffic status of a network chip, where the target network chip is a network chip in an idle state. The determining module 901 may be specifically configured to: implement determining functions in step 501 and step 801, and perform implicit steps included in step 501 and step 801.

The obtaining module 902 is configured to obtain a sleep running frequency of a first functional module in the target network chip, where the sleep running frequency is less than a predetermined proportion (for example, 5%) or a predetermined value of a standard running frequency of the first functional module. The obtaining module 902 may be specifically configured to: implement obtaining functions in step 502 and step 802, and perform implicit steps included in step 502 and step 802.

The control module 903 is configured to control the first functional module to run at the sleep running frequency. The control module 903 may be specifically configured to: implement control functions in step 503 and step 803, and perform implicit steps included in step 503 and step 803.

In some examples, the determining module 901 is configured to:
determine a network chip that meets an idle condition as the target network chip, where the idle condition is that none of ports of the network chip are connected to an optical module within latest first duration, each of ports of the network chip is in a disabled state within latest second duration, each of ports of the network chip is in an unconfigured state within latest third duration, or traffic of each of ports of the network chip is 0 within latest fourth duration.

In some examples, the obtaining module 902 is configured to:
obtain a preset sleep running frequency of the first functional module.

In some examples, the obtaining module 902 is further configured to obtain a low-power-consumption running frequency of a second functional module in the target network chip, where the low-power-consumption running frequency is less than a standard running frequency of the second functional module, and when the second functional module runs at the low-power-consumption running frequency, a function of the second functional module is available.

The control module 903 is further configured to control the second functional module to run at the low-power-consumption running frequency.

In some examples, when obtaining the low-power-consumption running frequency, the obtaining module 902 is configured to:
control the second functional module to run at at least one candidate running frequency, and perform functional testing; and
determine a lowest candidate running frequency in a candidate running frequency at which functional testing is passed as the low-power-consumption running frequency.

In some examples, when obtaining the low-power-consumption running frequency, the obtaining module 902 is configured to:
obtain a preset low-power-consumption running frequency of the second functional module.

In some examples, the apparatus further includes one or more of the following modules:
a pin control module, configured to: disable a pin of the target network chip, or set a pin of the target network chip to a high resistive state;
a first control module, configured to control to perform clock gating on a third functional module in the target network chip; and
a second control module, configured to control to perform power gating on a fourth functional module in the target network chip.

In some examples, the apparatus further includes a first wake-up module, where the first wake-up module is configured to:
when determining that the target network chip is in a non-idle state, control a running frequency of the first functional module to be increased to a first running frequency, where when the first functional module runs at the first running frequency, a function of the first functional module is available.

In some examples, the first wake-up module is configured to:
when determining that the target network chip meets a non-idle condition, determine that the target network chip is in the non-idle state, where the non-idle condition is that at least one port of the target network chip is switched from a state of not connecting to an optical module to a state of connecting to the optical module, at least one port of the target network chip is switched from an unconfigured state to a configured state, or at least one port of the target network chip is switched from a disabled state to an enabled state.

In some examples, the apparatus further includes a second wake-up module, where the second wake-up module is configured to:
when a failure mode and effects analysis FMEA detection periodicity is reached, control the running frequency of the first functional module to be increased to a second running frequency, where when the first functional module runs at the second running frequency, the function of the first functional module is available; and
control the target network chip to perform FMEA detection.

It should be noted that the determining module 901, the obtaining module 902, the control module 903, the pin control module, the first control module, the second control module, the first wake-up module, and the second wake-up module may be implemented by a processor, a processor in cooperation with a memory, or a processor by executing program instructions in a memory.

When the network chip management apparatus manages the network chip, division into the foregoing functional modules is used as an example for description. During actual application, the foregoing functions may be allocated to different functional modules for implementation based on a requirement, in other words, an internal structure of the network chip management apparatus is divided into different functional modules, to implement all or some of the functions described above. In addition, the network chip management apparatus provided in the foregoing embodiment and the network chip management methods shown in FIG. 5 and FIG. 8 belong to a same concept. For a specific implementation process of the network chip management apparatus, refer to a corresponding method part. Details are not described herein again.

An embodiment of this disclosure provides a computer-readable storage medium. The computer-readable storage medium stores at least one computer instruction. The computer instruction is read by a processor of a communication device, to enable the communication device to perform the network chip management method provided in embodiments of this disclosure.

An embodiment of this disclosure provides a computer program product. The computer program product includes computer instructions. The computer instructions are stored in a computer-readable storage medium. A main control board of a communication device reads the computer instructions from the computer-readable storage medium. The processor executes the computer instructions, to enable the communication device to perform the network chip management method provided in embodiments of this disclosure.

An embodiment of this disclosure provides a chip. The chip includes a memory and a processor. The memory is configured to store computer instructions. The processor is configured to: invoke the computer instructions from the memory, and run the computer instructions, to perform the network chip management method provided in embodiments of this disclosure.

A person of ordinary skill in the art may be aware that, in combination with the examples described in embodiments disclosed in this specification, method steps and units may be implemented by electronic hardware, computer software, or a combination thereof. To clearly describe interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing described system, apparatus, and unit, refer to a corresponding process in the foregoing method embodiments. Details are not described herein again.

In several embodiments provided in this disclosure, the disclosed apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate. Parts displayed as units may or may not be physical units, to be specific, may be located in one position, or may be distributed on a plurality of network units. Some or all of the units may be selected based on an actual requirement to achieve the objectives of the solutions of embodiments of this disclosure.

In addition, functional units in embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this disclosure essentially, or a part contributing to a conventional technology, or all or some of the technical solutions may be implemented in a form of a software product. The computer software product is stored in a storage medium and includes several instructions for instructing a computer device (which may be a personal computer, a server, a communication device, or the like) to perform all or some of the steps of the methods in embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this disclosure, but are not intended to limit the protection scope of this disclosure. Any equivalent modification or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method, applied to a communication device comprising a service board, the service board comprising at least one network chip, and the method comprising:
   determining a target network chip based on at least one of a port status, a configuration status, or a traffic status of the target network chip, wherein the target network chip is in an idle state, and wherein the target network chip is a network chip of the at least one network chip comprised in the service board;
   obtaining a sleep running frequency of a first functional module in the target network chip, wherein the sleep running frequency is less than a predetermined proportion or a predetermined value of a standard running frequency of the first functional module;
   controlling the first functional module to run at the sleep running frequency;

obtaining a low-power-consumption running frequency of a second functional module in the target network chip, wherein the low-power-consumption running frequency is less than a standard running frequency of the second functional module, and when the second functional module runs at the low-power-consumption running frequency, a function of the second functional module is available; and controlling the second functional module to run at the low-power-consumption running frequency while the first functional module is running at the sleep running frequency; and after controlling the first functional module to run at the sleep running frequency, the method further comprises:

when a failure mode and effects analysis (FMEA) detection periodicity is reached, controlling a current running frequency of the first functional module to be increased from the sleep running frequency to a second running frequency, wherein when the first functional module runs at the second running frequency, the function of the first functional module is available; and controlling the target network chip to perform FMEA detection while the first functional module runs at the second running frequency.

2. The method according to claim 1, wherein determining the target network chip based on at least one of the port status, the configuration status, or the traffic status of the target network chip comprises:

determining a network chip among the at least one network chip comprised in the service board that meets an idle condition as the target network chip, wherein the idle condition is that no port of a respective network chip is connected to an optical module within a latest first duration.

3. The method according to claim 1, wherein obtaining the sleep running frequency of the first functional module in the target network chip comprises:

obtaining a preset sleep running frequency of the first functional module.

4. The method according to claim 1, wherein obtaining the low-power-consumption running frequency of the second functional module in the target network chip comprises:

controlling the second functional module to run at at least one candidate running frequency, and performing functional testing; and determining a lowest candidate running frequency in a candidate running frequency at which functional testing is passed as the low-power-consumption running frequency.

5. The method according to claim 1, wherein obtaining the low-power-consumption running frequency of the second functional module in the target network chip comprises:

obtaining a preset low-power-consumption running frequency of the second functional module.

6. The method according to claim 1, wherein after determining the target network chip, the method further comprises:

disabling a pin of the target network chip, or setting a pin of the target network chip to a high resistive state;

controlling to perform clock gating on a third functional module in the target network chip; or controlling to perform power gating on a fourth functional module in the target network chip.

7. The method according to claim 1, wherein after controlling the first functional module to run at the sleep running frequency, the method further comprises:

when determining that the target network chip is no longer in the idle state, controlling the running frequency of the first functional module to be increased to a first running frequency, wherein when the first functional module runs at the first running frequency, a function of the first functional module is available.

8. The method according to claim 7, wherein determining that the target network chip is no longer in the idle state comprises:

when determining that the target network chip meets a non-idle condition, determining that the target network chip is no longer in the idle state, wherein the non-idle condition is that at least one port of the target network chip is switched from a state of not connecting to an optical module to a state of connecting to the optical module.

9. The method according to claim 1, wherein the predetermined proportion is 5%.

10. An apparatus, comprising:
at least one network chip;
a processor; and
a non-transitory computer readable medium storing a computer program that is executable by the processor, the program including instructions to:

determine a target network chip based on at least one of a port status, a configuration status, and a traffic status of the target network chip, wherein the target network chip is in an idle state, and wherein the target network chip is a network chip of the at least one network chip;

obtain a sleep running frequency of a first functional module in the target network chip, wherein the sleep running frequency is less than a predetermined proportion or a predetermined value of a standard running frequency of the first functional module;

control the first functional module to run at the sleep running frequency;

obtain a low-power-consumption running frequency of a second functional module in the target network chip, wherein the low-power-consumption running frequency is less than a standard running frequency of the second functional module, and when the second functional module runs at the low-power-consumption running frequency, a function of the second functional module is available;

control the second functional module to run at the low-power-consumption running frequency while the first functional module is running at the sleep running frequency;

after controlling the first functional module to run at the sleep running frequency, when a failure mode and effects analysis (FMEA) detection periodicity is reached, controlling a current running frequency of the first functional module to be increased from the sleep running frequency to a second running frequency, wherein when the first functional module runs at the second running frequency, the function of the first functional module is available; and controlling the target network chip to perform FMEA detection while the first functional module runs at the second running frequency.

11. The apparatus according to claim 10, wherein determining the target network chip based on at least one of the port status, the configuration status, or the traffic status of the target network chip comprises:

determining a network chip that meets an idle condition as the target network chip, wherein the idle condition is that no port of the respective network chip is connected to an optical module within a latest first duration.

12. The apparatus according to claim 10, wherein obtaining the sleep running frequency of the first functional module in the target network chip comprises:
    obtaining a preset sleep running frequency of the first functional module.

13. The apparatus according to claim 10, wherein obtaining the low-power-consumption running frequency of the second functional module in the target network chip comprises:
    controlling the second functional module to run at at least one candidate running frequency, and performing functional testing; and
    determining a lowest candidate running frequency in a candidate running frequency at which functional testing is passed as the low-power-consumption running frequency.

14. The apparatus according to claim 10, wherein obtaining the low-power-consumption running frequency of the second functional module in the target network chip comprises:
    obtaining a preset low-power-consumption running frequency of the second functional module.

15. The apparatus according to claim 10, wherein the program further includes instructions to, after determining the target network chip, perform the following:
    disabling a pin of the target network chip, or setting a pin of the target network chip to a high resistive state;
    controlling to perform clock gating on a third functional module in the target network chip; or
    controlling to perform power gating on a fourth functional module in the target network chip.

16. The apparatus according to claim 10, wherein the program further includes instructions to:
    after controlling the first functional module to run at the sleep running frequency, when determining that the target network chip is no longer in the idle state, controlling a current running frequency of the first functional module to be increased from the sleep running frequency to a first running frequency, wherein when the first functional module runs at the first running frequency, a function of the first functional module is available.

17. The apparatus according to claim 16, wherein determining that the target network chip is no longer in the idle state comprises:
    when determining that the target network chip meets a non-idle condition, determining that the target network chip is no longer in the idle state, wherein the non-idle condition is that at least one port of the target network chip is switched from a state of not connecting to an optical module to a state of connecting to the optical module, at least one port of the target network chip is switched from an unconfigured state to a configured state, or at least one port of the target network chip is switched from a disabled state to an enabled state.

18. A non-transitory computer readable medium storing a computer program that is executable by at least one processor, the program including instructions to:
    determine a target network chip based on at least one of a port status, a configuration status, and a traffic status of the target network chip, wherein the target network chip is in an idle state, and wherein the target network chip is a network chip of at least one network chip;
    obtain a sleep running frequency of a first functional module in the target network chip, wherein the sleep running frequency is less than a predetermined proportion or a predetermined value of a standard running frequency of the first functional module;
    control the first functional module to run at the sleep running frequency;
    obtain a low-power-consumption running frequency of a second functional module in the target network chip, wherein the low-power-consumption running frequency is less than a standard running frequency of the second functional module, and when the second functional module runs at the low-power-consumption running frequency, a function of the second functional module is available;
    control the second functional module to run at the low-power-consumption running frequency while the first functional module is running at the sleep running frequency;
    after controlling the first functional module to run at the sleep running frequency, when a failure mode and effects analysis (FMEA) detection periodicity is reached, controlling a current running frequency of the first functional module to be increased from the sleep running frequency to a second running frequency, wherein when the first functional module runs at the second running frequency, the function of the first functional module is available; and
    controlling the target network chip to perform FMEA detection while the first functional module runs at the second running frequency.

19. The non-transitory computer readable medium according to claim 18, wherein determining the target network chip based on at least one of the port status, the configuration status, or the traffic status of the target network chip comprises:
    determining a network chip among the at least one network chip that meets an idle condition as the target network chip, wherein the idle condition is that no port of a respective network chip is connected to an optical module within a latest first duration.

20. The non-transitory computer readable medium according to claim 18, wherein obtaining the sleep running frequency of the first functional module in the target network chip comprises:
    obtaining a preset sleep running frequency of the first functional module.

* * * * *